Sept. 6, 1949.　　　　J. V. RICE, JR　　　2,480,879
POWER ACTUATED PERCUSSION TOOL
Filed June 22, 1944　　　　　　　　　　　6 Sheets-Sheet 2
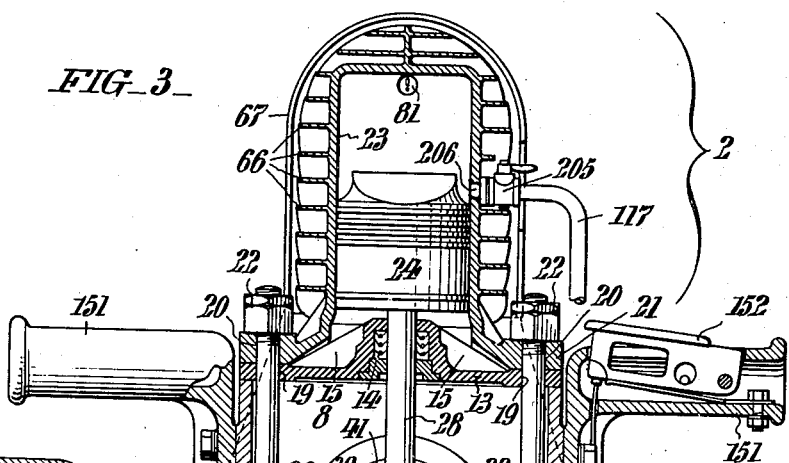
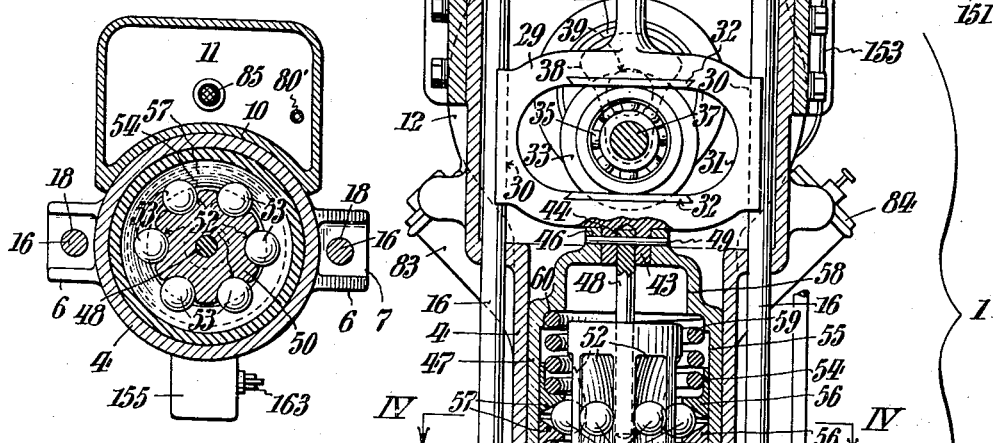
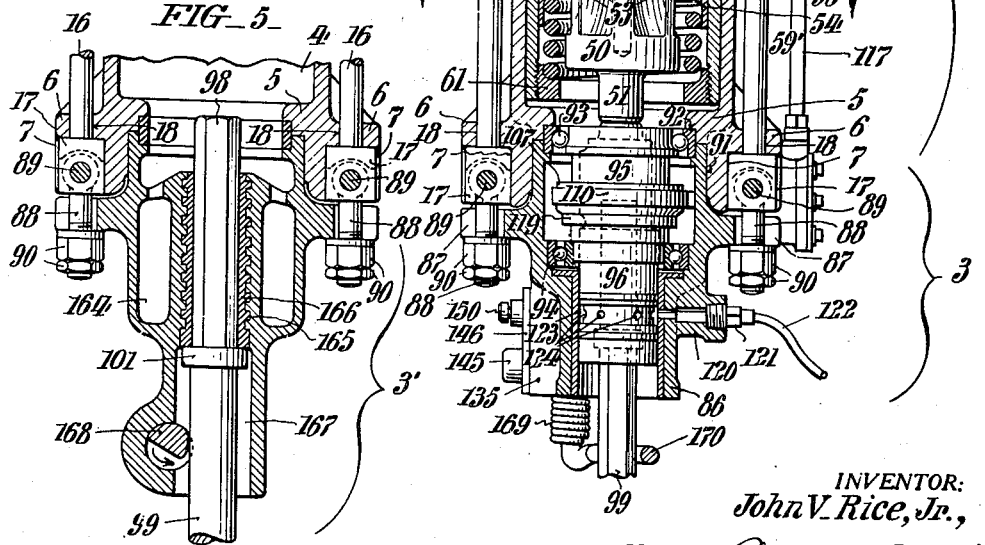
INVENTOR:
John V. Rice, Jr.,
BY
Paul & Paul
ATTORNEYS.

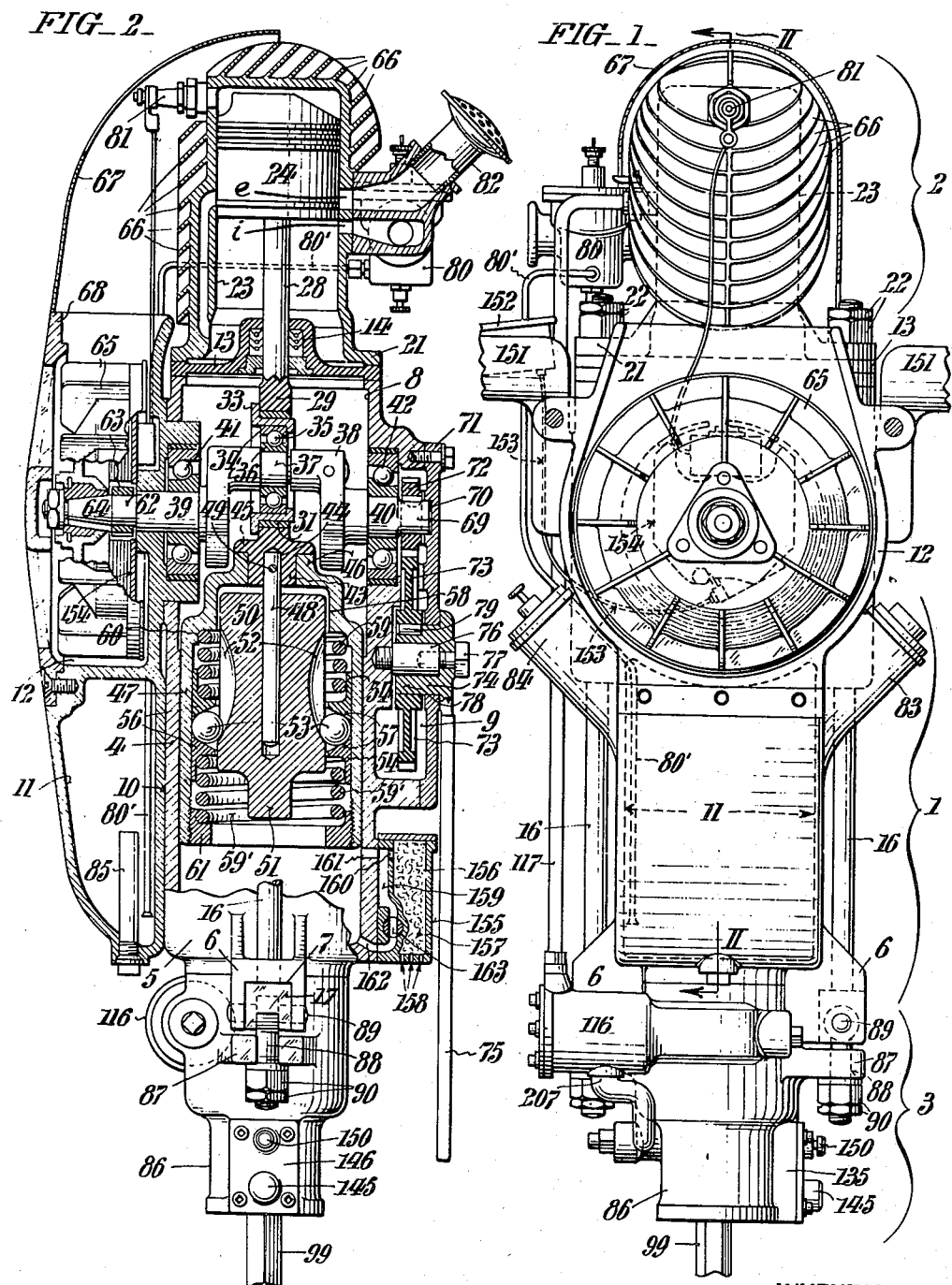

Sept. 6, 1949. J. V. RICE, JR 2,480,879
POWER ACTUATED PERCUSSION TOOL
Filed June 22, 1944 6 Sheets-Sheet 3
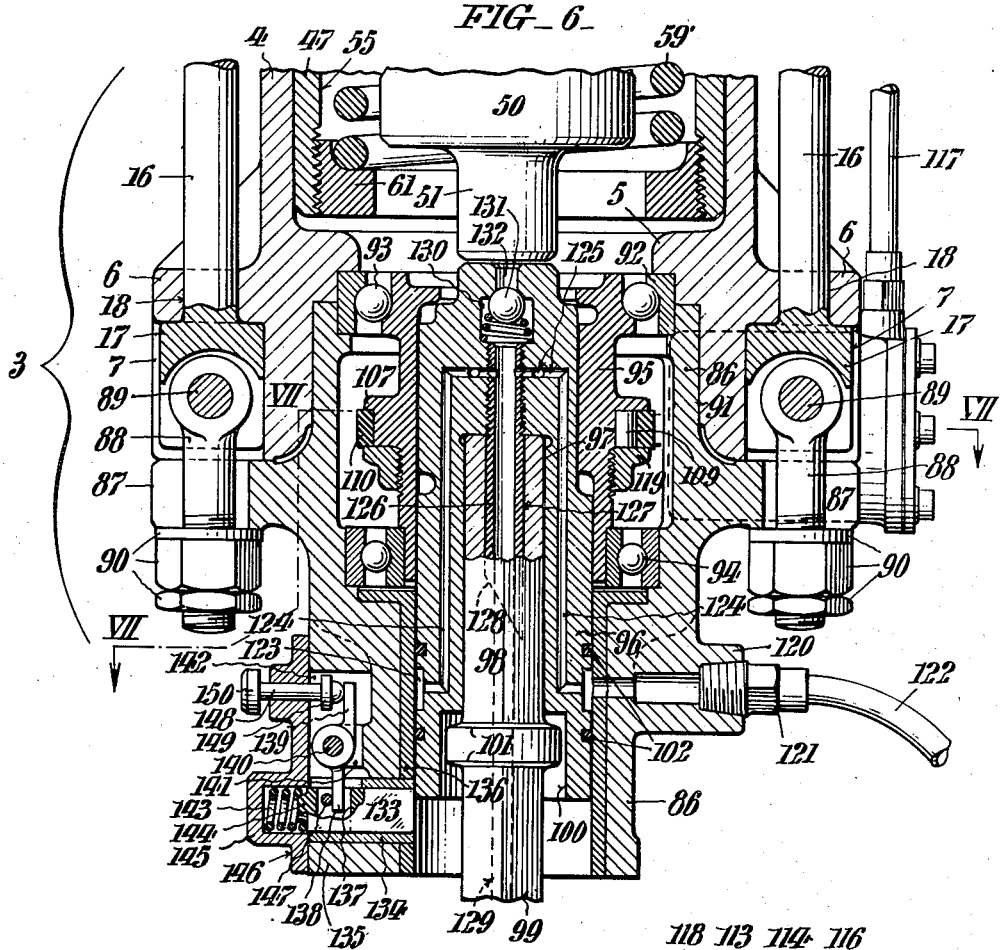
INVENTOR:
John V. Rice, Jr.,
BY Paul Paul
ATTORNEYS.

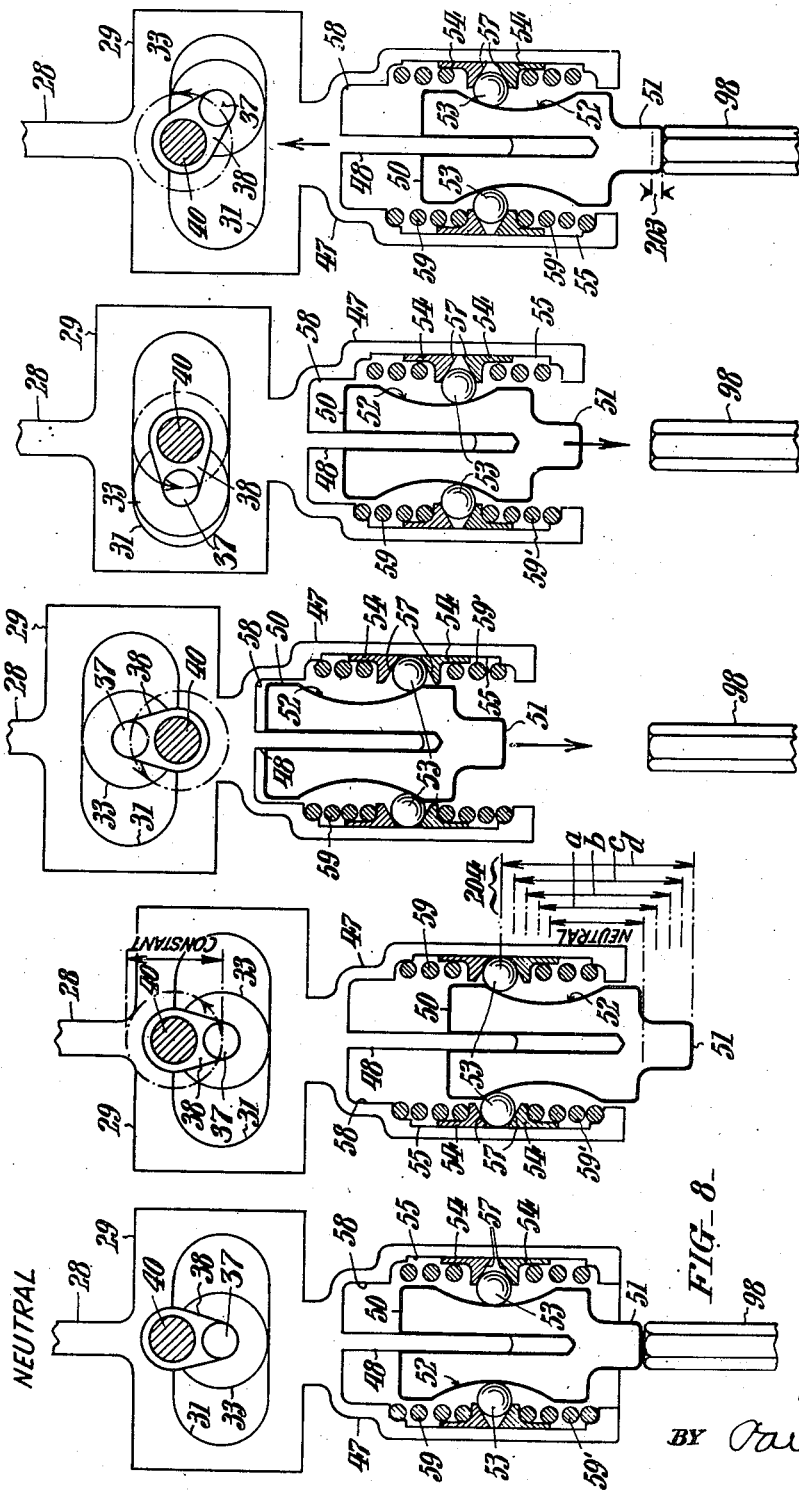

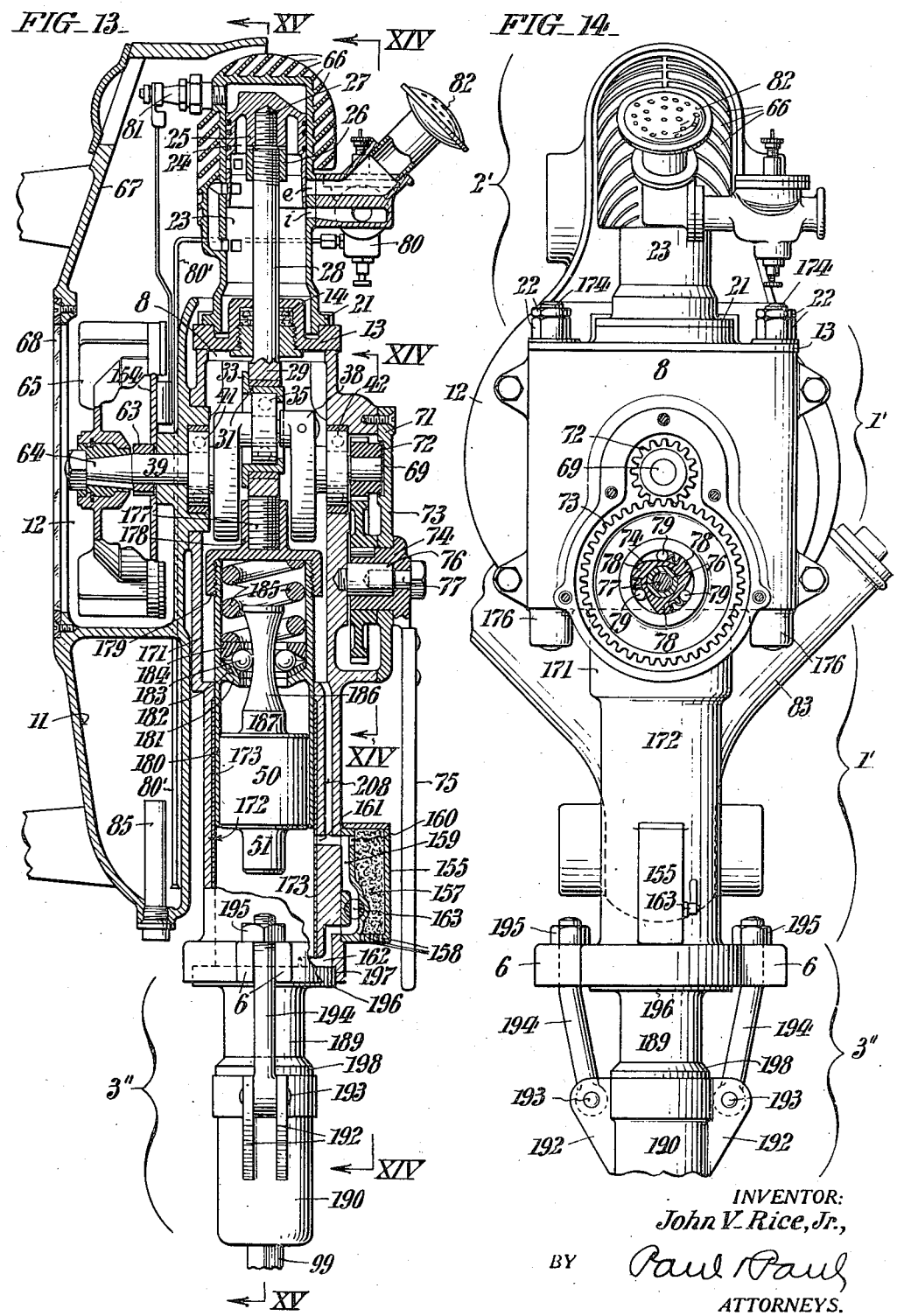

Sept. 6, 1949.  J. V. RICE, JR  2,480,879
POWER ACTUATED PERCUSSION TOOL
Filed June 22, 1944  6 Sheets-Sheet 6
FIG_15
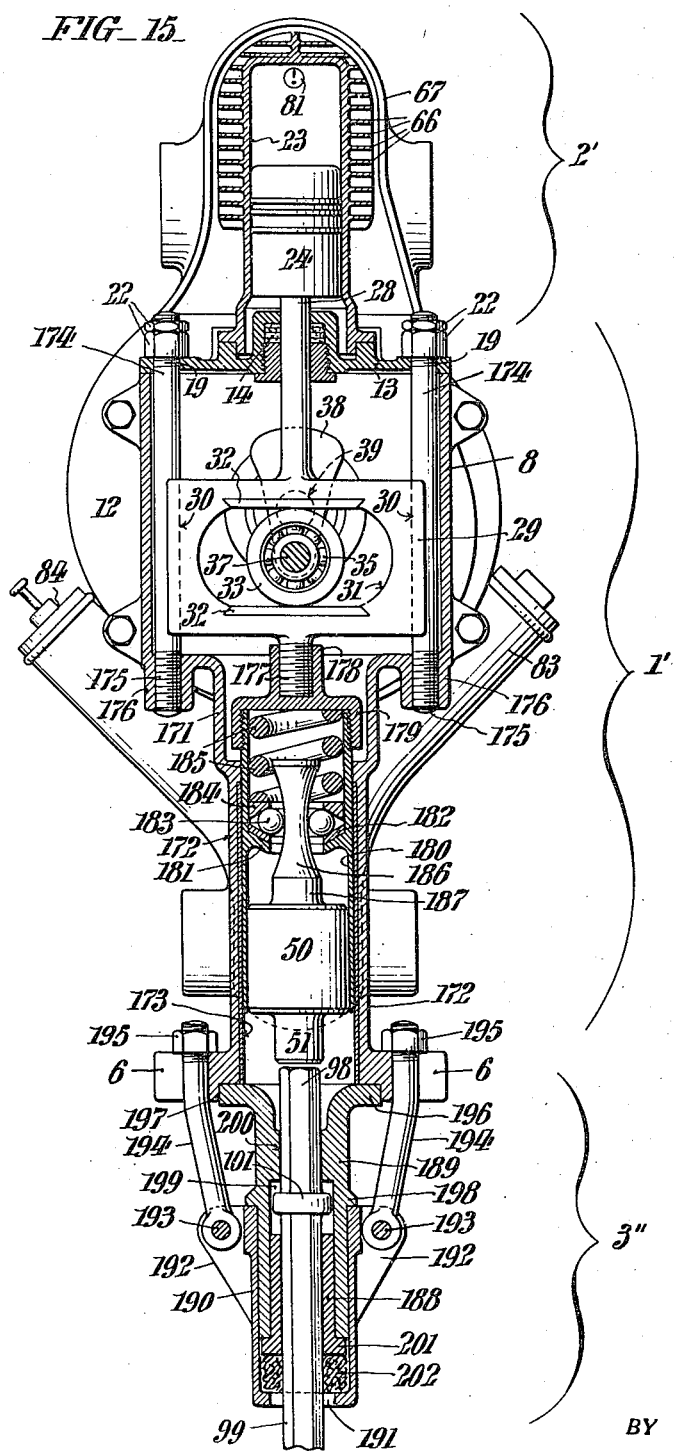
INVENTOR:
John V. Rice, Jr.,
BY Paul Paul
ATTORNEYS.

Patented Sept. 6, 1949

2,480,879

UNITED STATES PATENT OFFICE 2,480,879

POWER ACTUATED PERCUSSION TOOL

John V. Rice, Jr., Philadelphia, Pa., assignor to John V. Rice, Jr. Corporation, Philadelphia, Pa., a corporation of Delaware Application June 22, 1944, Serial No. 541,641

11 Claims. (Cl. 123—7)

This invention has general reference to power actuated percussion devices and, more particularly, to the species preferably operated by an internal combustion motor. Devices of the species referred to while more or less efficient for their intended use are subject to excessive vibration which is directly imparted to the operator with resultant inconvenience and unnecessary strains.

The primary object of the present invention is the provision of novel means whereby the operating shocks and objectionable vibration of percussion tools are reduced to the minimum.

Another object of this invention is the provision of a fluid-actuated impact-imparting paving-breaker and/or drilling instrumentality in which acceleration of the speed of the motive means proportionately augments the impact momentum of the tool, and vice versa.

A further object of this invention is to provide a device or instrumentality of the type referred to in the preceding paragraph which is easily adapted for different classes of work, such as breaking, drilling, or tamping, without interfering with its efficiency.

A still further object is to provide a device or instrumentality of the above indicated species including provisions whereby "wet" drilling can be effected, and the operation carried on without interference from accumulating boring matter tending to clog the drill, while the life of the latter is increased.

With the foregoing and other objects, as well as ancillary advantages in view, this invention further aims to provide a percussion tool embodying features of novelty whereby the same is rendered thoroughly reliable and effective in operation, is positive in action, and is readily adaptable for diversified kinds of work with but little and easily made changes.

While the foregoing definitions are indicative in a general way of the aims of this invention, others will be evident to those skilled in the art upon a full understanding of the means hereinafter fully disclosed; but it will also be appreciated that said invention is susceptible of other embodiments or structurally modified forms coming equally within the terms and scope of the concluding claims.

To the attainment of the above recited objectives, and generally stated, this invention consists of the novel devices, combinations of the same and arrangements of the parts typically illustrated by the accompanying six sheets of drawings; and in which:

Fig. 1 is an elevation of a paving-breaker and rock-drill including the improvements of this invention, having the handles in part broken away to compact the view, and a protective shield or hood in section with the major portion removed for clearer illustration of otherwise hidden structure.

Fig. 2 is a longitudinal section taken approximately as indicated by the angle-arrows II—II in Fig. 1.

Fig. 3 is a section similar to that of the preceding figure, but taken on a plane at right-angles thereto and with the operating mechanism in a different position.

Fig. 4 is a cross-section taken approximately as designated by the angle-arrows IV—IV in Fig. 3.

Fig. 5 is a fragmentary section of the lower end portion of the tool of this invention with a substitute head for application thereto when said tool is to be used for tamping purposes only.

Fig. 6 is a larger scale axial section of the lower portion of Fig. 3, to better illustrate important structural features hereinafter fully described.

Fig. 7 is a staggered cross-section taken on the plane designated VII—VII in Fig. 6.

Figs. 8–12 inclusive, are diagrammatic views illustrative of the operative cycle of the tool illustrated by the preceding views.

Fig. 13 is a longitudinal section, similar to Fig. 2, of a modified form of the invention preferably adapted for tamping purposes only.

Fig. 14 is an elevation of the same as viewed looking toward the left of Fig. 13, with those parts to the right-hand of the plane indicating angle-arrows XIV—XIV, removed for clearer illustration of underlying features.

Fig. 15 is a longitudinal section taken substantially as indicated by the angle-arrows XV—XV in Fig. 13.

In describing the forms of this invention exemplified by the drawings herewith, specific terms will be employed for the sake of clarity, but it is to be understood the scope of said invention is not thereby limited, each such term being intended to comprehend all equivalents which perform the same function for an analogous purpose.

Referring in greater detail to the drawings, and firstly to Figs. 1–7 more particularly, said figures illustrate a practical embodiment of the invention capable of use as a paving-breaker, as a rock-drill, or for general tamping purpose. In this embodiment of the invention the device or tool comprises an intermediate section comprehensively designated by the reference character 1;

an upper portion or motive-power unit 2; and a lower detachable tool-holder section 3.

The section or housing 1 embodies a cylinder 4 having one end—the lower for instance—reduced at 5, and provided with opposed projections 6 defining rectangular recesses or anchorages 7, the purpose of which will be later on explained. In addition, the section 1 embodies an upper—for example—approximately rectangular-section extension or crank-chamber 8; a longitudinally directed gear casing 9 and, to the opposingly related wall 10, there is attached by suitable securing means, not indicated, a composite fuel-chamber 11 and fan-housing 12.

Closing the outer end of the crank-chamber 8 is a head 13 including a centrally located gland 14 with radially related gusset reinforcements 15; and to said head 13 is applied the motive-power unit 2; while the section 1, head 13 and unit 2 are rigidly secured together in axial alignment by through-bolts 16 having forked heads 17 nonrotatably engaged in the anchorages 7 aforesaid, and passed through aligned holes 18, 19, 20, provided for the purpose, respectively in the anchorages 7, head 13, and the attaching flange 21 of the unit 2, with application thereto of lock-nuts 22, in an obvious manner.

In the cylinder 23 of the power unit 2 is a conventional bell-shaped piston 24, see Fig. 13 to best advantage, the same having secured to a central boss 25, as by a lock-nut 26, the reduced end 27 of a piston-rod 28. On reference back again to Figs. 1–7 it will be seen that the piston-rod 28 is provided at its inner end with a yoke 29, having end grooves 30 slidably coactive with the through bolts 16 and whereby said yoke is constrained to a direct path of movement. The loop 31 of the yoke 29 is conveniently fitted with durable wear-pads 32 between which a Z-section annular roller 33 engages; said roller, in-turn having secured therein the outer race-component 34 of a ball-bearing 35, in the inner race-component 36 whereof is journaled the reduced medial portion 37 of a double-crank 38, the respective shaft portions 39, 40 of said crank being journaled in ball-bearings 41, 42, later on again referred to.

As best shown in Figs. 2 and 3 the yoke 29 is provided, beyond the loop 31, with a projection 43 in axial alignment with the piston-rod 28, said projection having a bore 44 and a flange 45, the latter providing abutment for the neck-portion 46 of a counterbored bell-like member 47, in turn slidable in the bore of the cylinder 4; whereas into the bore 44 aforesaid there is fitted a guide-rod 48 which is rigidly secured in place by a diametrically related drift-pin 49 engaged therethrough as well as across the parts 43 and 46. The rod 48 affords direct-axial guidance for the impact-imparting element or hammer 50 which is preferably in the form of a solid cylinder having a relatively reduced striker extension 51, said hammer having circumferentially spaced lengthwise-disposed concave-grooves 52 with which individually engage a circular series of spaced balls 53 coactive with a runway or bearing preferably, of opposed race-members 54. Each race or bearing member 54, it will be observed, is of annular formation to slidably fit the major bore 55 of the bell-like member 47, and also embodies an inner shoulder 56 having a bevel face 57 with which the balls 53 coact in an obvious manner. It is to be further noted, that the diameter of the hammer 50 is such as to permit its free entry into the cupped or minor-bore portion 58 of the member 47, as later on explained.

The impact-imparting element or hammer 50 is sustained in the bell-like member 47 preferably by spiral springs 59, 59', respectively between the race component shoulderings 56 and an annular groove 60, intermediate the major and minor bores 55, 58 of said member 47, and a cupped annulus 61 threadedly engaged in the open end of the member 47, as clearly understandable from Figs. 2 and 3 more particularly.

Referring again to the double-crank 38, and the shaft-portion 39 thereof which, as before stated is journaled in the ball-bearing 41 it will be seen, on reference to Fig. 2, that said shaft-portion 39 is reduced at 62 for application thereto of a conventional spark cam 63, as well as tapered at 64 for rigid attachment of the magneto-rotor and fan 65 which operates in the housing 12, hereinbefore referred to. Attention is here directed to the fact that the housing 12, as best shown in Fig. 1 converges upwardly, so that air drawn in by the fan 65 is directed upwardly against, and about, the inclined fins 66 of the cylinder 23 to efficiently cool the latter, such action being aided by a hood 67 partially enclosing said cylinder; all as readily understood by those conversant with the art. In addition the housing 12 is fitted with a removable cover 68 so as to afford ready access to the fan 65 and associated parts for purposes of adjustment and setting of the angular position of the cam 63.

The other shaft-portion 40 of the double-crank 38, that is journaled in the ball bearing 42, is reduced at 69 and projects outwardly into a socket bearing 70, in the removable cover 71 of the gear casing 9; and, on said reduced part 69 is secured a pinion 72 in mesh with a substantially larger gear 73, see Figs. 13 and 14 to best advantage, in turn mounted on the hub-portion 74 of the starting lever 75 with capacity for incremental rotative movements. The hub-portion 74, see Fig. 14, is fulcrumed on a pivot stud 76 rigidly fixed in the casing 9, and is held against axial displacement by a bolt 77, as readily understandable on examination of said figure; while it is formed with circumferentially spaced ratchet-like portions 78 for coaction with spring-influenced friction elements 79, whereby the gear 73 is angularly shiftable by the starting lever 75 in a clockwise-direction, for instance.

The carburetor is comprehensively designated by the reference character 80, while 80' indicates the supply pipe from the fuel-chamber 11; the spark-plug by 81; the exhaust means by 82; 83 indicates the filler connection for the fuel-chamber 11; 84 the conventional air-pump; while 85 designates a conventional dehydrator for removal of any water that may collect in the gas in the fuel-chamber 11.

Referring now to the tool-holder section 3, Figs. 1–3, 6 and 7, the same comprises a main cylindrical body part 86 having opposed bifurcations 87 for reception of the shank portions of eye-bolts 88 fulcrumed by pins 89 in the forked heads 17 of the through bolts 16, hereinbefore referred to; said eye-bolts being provided with clamp-and-locking means 90 whereby the tool-holder section 3 is rigidly attached in axial alignment to the parts 1 and 2 before described. Attention is directed to the fact that the outer upper portion of the body part 86 is finished for frictional engagement in a bore 91 provided for its reception in the confronting portion of the cylinder 4, with provision for retention of the outer race component 92 of a ball-bearing 93 which, in conjunction with an outwardly-related or lower ball-bearing 94, affords support for a tubular or cylindrical-head 95, in which operates the tool-holding element or chuck 96. This chuck 96, as best understood from Fig. 7, is a substantially solid cylinder with a polygonal section bore 97, for snug reception of the correspondingly-shaped shank 98 of the work effecting tool or bit 99, and a counter-bore 100 in which the collar or shouldered part 101 of said bit can freely move, while said tool-holding chuck is preferably fitted with packing-rings 102 to ensure fluid-tightness. In addition the tool-holding chuck 96 is conveniently formed at its upper part with three—for example—equal sized arcual-grooves 103 defined by three corresponding circumferentially-spaced equal sized segments 104, for engagement in counterpart segments 105 and grooves 106 provided for the purpose in the upper part of the bore of the head 95, whereby the parts 95 and 96 are restrained against relative rotation, while the latter 96 is permitted a degree of tool-feeding movement, as later on explained.

In order to impart incremental rotative movement to the head 95 and chuck 96 the former is provided with a surrounding enlargement or flange 107 in which are formed equally spaced tangential notches 108 containing spring-influenced balls, pins or rollers 109 adapted for clutching engagement with the inner surface of an annular ring 110, coupled at 111 to the adjoining end of a connecting-member 112 in turn pivoted at 113 to the shank 114 of a cupped-piston 115 in a cylinder 116 forming a part of the section 3 aforesaid. The piston 115 is intermittently driven forward by pressure from the motive-power unit 2 by way of pipe-connection 117, in a manner well understood by those conversant with the art, while said piston operates in opposition to a spiralized buffer spring 118 which effects the return movement. A retainer ring 119 is threaded on the cylindrical head 95 for maintaining the parts 109 and 110 in operative assembly.

To make provision for "wet-drilling" when desirable, the tool-holder section 3 is provided with an orificed part 120, for coupling-connection thereto at 121 of a flexible water supply pipe 122; said part 120 affording flow communication into a circumferential groove 123 around the chuck 96 preferably intermediate the packing rings 102. From the groove 123, ducts 124 extend in spaced circumferential and serial relation through the chuck 96, with mutual interconnection at their upper ends 125 into an axially rigid tube 126 slidably engaged in a bore 127 provided in the shank 98 of the tool or bit 99. Attention is here directed to the fact that the lower end of the tube 126 is tapered at 128 and that the bore thereof is approximately the same as that of an aligned bore 129 extending down to the tip of the tool or bit 99, while the tapering end 128 seats on the correspondingly inclined bottom of the bore 127 aforesaid. The upper end of the tube 126 opens into a concentric chamber 130 which houses an upwardly-influenced ball-check 131, normally closing an axial air-pressure inlet 132 in the top of the cylindrical head 95, for a purpose later on herein clarified.

In order to prevent the head 96 from becoming accidentally detached from the tool-holder 3 while the machine or device is operating, such as when shifting the latter's position to effect a fresh cutting break, or to make a fresh boring, there is provided a manually-releasable arrestor, which is shown to best advantage at the left-hand side of Fig. 6. This arrestor preferably comprises a slidable-bolt 133, of a cross-section at its inner end for engagement in the circumferential-groove 123 about the head 96, said bolt being operative in a sleeve 134 inset through an embossment 135 at the lower end of the body-part 86 and a liner sleeve 136, whereby the latter is held rigidly against axial shifting, in an obvious manner. The bolt 133 is provided with a suitable orifice or slot 137 into which depends the finger 138 of a rockable-trigger 139 fulcrumed at 140 between spaced ears 141 in a recess 142, provided for the purpose in the part 86, and said bolt is inwardly-influenced by a spring 143 in compression intermediate the bolt head 144 and the inner end of a socket 145 integral with a cover-plate 146, closing in the recess 142 and trigger 139. The trigger 139, at its lower part engages a through pin 147 across the bolt slot 137, and at the upper portion abuts the inner end of a shifter means 148 having a movement limiting collar 149 and a head 150 at the outer extremity of said means. It will be evident that whenever the groove 123 in the head 96 registers with the inner end of the bolt 133, that the latter will be automatically projected by the spring 143 into said groove and thereby arrest further outward movement of the head 96; while to release the same the head 150 can be kicked by the operator's foot in an obvious manner.

Opposed handles 151 are suitably attached to, or formed integral with, the intermediate section 1, while one of them is fitted with a spring influenced control 152 having a flexible-shaft connection 153 to the magneto stator-plate 154, or the throttle of the motive-power unit 2, whereby the speed of said unit is increased, and vice versa.

Air can be circulated through the lower portion of the intermediate section 1 and the tool-holder section 3 by way of a cleaner 155, Figs. 2 and 13, said cleaner preferably including a chamber 156 filled with mineral-wool 157—for example—effective to thoroughly free the air entering by way of perforations 158 from dust, or hard particles, etc., which might tend to clog, choke or injure the relatively moving parts and flow passages, respectively. The cleaner 155 is also provided with a port 159, having an inlet 160 from the mineral-wool containing chamber 156, in alignment with an admission orifice 161 through the wall of the section 1, while a return passage 162 connects into the lower end of the port 159, and across which is fitted a turn-cock 163, for a purpose hereafter set forth.

In Fig. 5 there is shown an alternative form of toolholder section 3' specially designed for tamping usage only and which is readily substitutable, for that previously described, by simply releasing the eye-bolts 88, swinging them outwardly on their respective fulcrum pins 89, and then drawing out the toolholder 3; whereupon the section 3' can be inserted and the eye-bolts 88 returned to clamping position. The substitute section 3' is of mainly cylindrical formation to include an annular cooling chamber 164, a central grooved-bore 165 for insertion of a longitudinally-multipart thrust-sleeve 166 preferably so made for purposes of easy assembly, and a plain bore extension 167 tangentially across which is fitted a cam-like turn-key 168 effective, in the position shown, to prevent the tool or bit 99 from falling-out in an obvious manner; but when turned in the direction indicated by the associated arrow permitting easy withdrawal of said tool or bit.

As an additional protective means a spiral-spring 169, Fig. 3, may be firmly anchored at one end to the tool-holder 3, and include a loop 170 at the other end freely engageable about the tool or bit 99 below the shouldered part 101. This spring 169 may also serve as a reactive means when the tool or bit 99 is struck with maximum force by the hammer 50, as readily appreciable by those conversant with the art.

Referring now to Figs. 13–15 inclusive, which show an embodiment of this invention designed for tamping purposes only, all parts corresponding with those previously described are similarly designated by life reference characters, to obviate unnecessary repetitive description; and, accordingly, only those features which distinguish from the first explained form of said invention will be now explained. In the first place, it is to be remarked that the intermediate section 1' differs somewhat from the form 1, in that it embodies in addition to the crank-chamber 8 a major-diameter relatively short cylindrical portion 171 with a minor-diameter considerably longer portion 172, and that the bore of the latter is fitted with a liner 173. Also it is to be observed that the through-bolts 16 are dispensed with and replaced by guide-rods 174 for the yoke 29, said rods having their lower ends screw-threaded at 175 into apertured embossments 176, as clearly shown in Fig. 15; while the rods 174 also clamp the motive-power unit 2' directly on the section 1' by aid of the lock-nuts 22, as before set forth. The bell-like member previously set forth as secured to the axial extension 43, by the drift pin 49, is in the present instance replaced by a screw-threaded axial portion 177 engaged in the central portion 178 of a cupped-cap 179, threaded on the upped end of a tubular member or cylinder 180, having—intermediate flared for seating reception of the lower bearing its ends—an internal flange 181 appropriately or raceway component 182 and ball-bearing elements 183, the other bearing or raceway component 184 whereof affords a seat for the lower end of a spring 185 in compression, between said component 184 and the inner end of the cupped-cap 179; while it is noticeable that both of the components 182, 184 have relatively confronting beveled faces 57 as before described in connection with the parts 54. The ball-bearing elements 183 afford guiding-support for an axially reciprocative double-conical spool 186 whose mid-section is the smaller in diameter.

The spool 186 has a depending stem 187 forming a part thereof, and the solid cylindrical hammer 50, which latter includes the striker extension 51, as explained in connection with the first described form of the invention. The hammer 50, it will be noted, operates in the tubular member 180 below the internal flange 181, as later explained.

The tool-holder section 3'', in this form of the invention differs considerably from the forms previously designated as 3 and 3', in that it comprises three sections or axially-concentric parts 188, 189 and 190. The part 190 is somewhat in the form of a suspension socket having an orifice 191 in its bottom, through which the tool or bit 99 operates, while it embodies spaced lugs 192, between which are fulcrumed, by pivot-pins 193, eye-bolts 194 with lock-nuts 195, whereby the section 3'' is rigidly secured to the cylinder extension 172 by coaction of said nuts with diametrically-opposed forked projections 6 at the lower end of said extension. Snugly fitting the suspension socket 190 is the tubular member 189 which has an upper flange 196 engageable in a counter-bore 197 provided for the purpose in the lower end of the extension 172 aforesaid. The tubular member 189 also embodies a surrounding shoulder 198 for abutment with the confronting end of the socket 190, a plain bore 199, and an intermediate polygonal section 200 in which the shank 98 of the tool or bit 99 operates as before set forth; while fitting said member 189 is the tubular part 188 above mentioned, said sleeve preferably being made in two lengthwise sections or halves for ease in assembly and having a lower flange 201 seating on a suitable cushioning-gasket or packing medium 202.

Having explained the structural features of the typical forms of the invention illustrated the operation thereof is as follows: Firstly the form of the invention shown in Figs. 1 to 7 will be dealt with in conjunction with the diagrams of Figs. 8 to 12. Assuming the percussion tool fuel-chamber 11 has been supplied with an appropriate gas and that current is turned on to the magneto by a switch—not shown—the operator first primes the carburetor 80 by manipulating the pump 84, and then swings the starting-lever 75 upwards by means of the clutch means 78, 79 and gears 73, 72 which turn the double-crank 38 over, until the piston 24 has drawn in a charge of combustible mixture, from the carburetor 80 for compression and explosion by the spark plug 81, in accordance with known practice, to initiate the operating cycle. More specifically, and referring now to Fig. 8 which shows the crank 38 and yoke 29 in neutral position, with the hammer 50 sustained by the circumferentially-spaced balls 53 being radially-forced into the mid or deeper portion of the concave grooves 52 under the joint action of the springs 59, 59' and race members 54. In other words, the hammer 50 is automatically held in balance when the percussion tool is not operating, with resultant assurance that the crank 38 and piston 24 always come to rest approximately in the neutral position of Fig. 8. Incidental to the movement of the starting-lever 75, as above set forth, the crank 38 is turned from the position of Fig. 8 to approximately that of Fig. 9, for the suction-stroke of the piston 24; or, said piston 24 moves down from the showing in Fig. 2 to that of Fig. 3 with similar transfer of the yoke 29 which, through the connections 43, 45, 46, and lateral travel of the roller 33 in the loop 31, moves or telescopes the bell-like member 47 axially relative to the hammer 50. Otherwise expressed, the head of said hammer 50 enters into the minor bore 58 of the bell-like member 47, with concurrent separation of the race members 54 by the spaced balls 53 progressing outwardly towards the lower ends of the opposed concave-grooves 52 with equalizing movement of the respectively associated springs 59, 59'. Thus it will be evident that the elastic limit of the springs 59, 59' can never be reached by virtue of the balls 53 being restricted to limited relative radial separation intermediate the curved surface of the grooves 52 and the major-bore 55 of the member 47, and constant retention of the movement of the hammer 50 directly axial, as controlled by the guide-rod 48. On the return or up-stroke of the piston 24 it will be further observed that, in such passage, a charge of the explosive-mixture is drawn from the carburetor 80 by way of the admission or inlet port i, Figs. 2 and 13, and compressed in the cylinder 23 as said piston approaches its upper predetermined stroke limit, while the crank 38 and yoke roller 33, as well as the member 47, will have been shifted to the respectively depicted positions of Figs. 8 and 10.

Immediately explosion of the compressed charge by the spark from the plug 81 takes place, the effective stroke of the piston 24 ensues, with resultant movement of the crank 38 from the position of Fig. 10 to that of Fig. 11, or through an angle of approximately one-hundred-thirty-five degrees during which time the blow of the hammer 50 on the tool or bit 99 occurs, the actual impact effect being indicated by the space 203, intermediate the top end of said tool or bit shank 98 and the dot-and-dash line thereabove in Fig. 11. At this juncture, it is to be particularly noted, that by increasing the speed of the power-unit 2 the impact of the hammer blow is increased. Another noteworthy feature is that with an engine stroke of two-and-one-quarter inches, for example, it has been found that by mounting the hammer 50, in the manner shown and described, the stroke of said hammer can be varied from four-and-one-quarter to four-and-one-half inches by simply accelerating the speed of the power-unit 2; or, in other words, actual tests have shown that acceleration of the piston stroke of such unit proportionately augments the impact momentum of the hammer 50 on the tool or bit 99. Fig. 12 schematically shows four different impact-variations collectively designated 204, of which the hammer 50 is capable; with a definite constant for the crank 38 and four speed accelerations a, b, c and d thereof which, proportionately augment, the force of the blow that can be struck on the tool or bit 99 by stepping-up the travel of the hammer 50 relative to the speed of the stroke of the piston 24 and movement of the yoke 29.

Concurrent with the operation above set forth, and assuming the tool-holder section is to be used for rock-drilling as an example, the operator opens the valve 205, Fig. 3, so that a diverted flow of the exploded mixture in the power-unit cylinder 23, may pass the port 206, through said valve, and pipe connection 117 to the cylinder 116 for operation of the piston 115, and resultant incremental-rotation of the tool-holding chuck 96, as hereinbefore set forth; while exhaust of the pressure flow, so diverted, takes place by way of a port 207, Fig. 7 to the atmosphere, in an obvious manner.

When "wet" drilling is to be effected, it will be readily understood that the pipe 122 is preferably connected to a head of water pressure, whereupon a flow of such water will pass through the bore of the rigid tube 126 and the bore 129 of the tool or bit 99 to the point of working of the latter, such action being intermittently effected by air entrained in the bell-like member 47 being forced, on the down stroke of the hammer 50, past the ball-check 131. This air is intermittently drawn into the tool by way of the air-cleaner 155, through the bore of the member 47 for forced flow past the ball-check 131, in an obvious manner; or, it may be conducted above said member by way of a passage or duct 208, Fig. 13, provided for the purpose in the wall of section 1, as readily appreciable by those conversant with the art.

From the foregoing the operation of the modified form of the invention shown by Figs. 13–15 will be clear without further elaboration herein. It will also be recognized that the various parts or elements of this invention, may be replaced by other equivalents without departing from the spirit of said invention; therefore this invention is not limited to the forms actually illustrated and explained, nor to the combinations of such disclosure, but also resides in sub-combinations and such other arrangements, as are fairly considered comprehensible within the full scope of the following claims.

Having thus described my invention, I claim:

1. In a percussion device, the combination of an internal combustion motor including a piston with a yoke at the other end of the piston rod; a housing comprising a rectangular-section with an axially-related cylindrical portion; a hollow-extension, beyond the yoke, operative in said housing cylindrical portion; spaced reactive means with intervening bearing-members movable in said hollow extension; an impact-imparting device concentrically sustained by radially-movable elements between the bearing-members; said reactive means, bearing-members and radially-movable elements jointly serving to reduce operating vibration to the minimum; a removable tool-holder at the outer end of the housing cylindrical portion; means rigidly securing the power-unit, housing and tool-holder in co-axial alignment; means operative from and concurrently with the expansion stroke of the piston to incrementally-turn the tool-holder; and pressure controlled means intermittently-operable to force liquid through said holder to free the tool active end from becoming clogged by boring chips or the like.

2. In a percussion device, the combination of an internal combustion motor including a piston with a yoke at the other end of the piston rod; a housing comprising a rectangular-section with an axially-related cylindrical portion; a hollow-extension, beyond the yoke, operative in said housing cylindrical portion; spaced reactive means with intervening bearing-members movable in said hollow extension; an impact-imparting device concentrically sustained by radially-movable elements between the bearing-members; said reactive means, bearing members and radially-movable elements jointly serving to reduce operating vibration to the minimum; a removable tool-holder at the outer end of the housing cylindrical portion; means rigidly securing the power-unit, housing and tool-holder in co-axial alignment; means operative from and concurrently with the expansion stroke of the piston to incrementally-turn the tool-holder; pressure controlled means intermittently-actuable to force liquid through the tool-holder to the active end of the tool; and an air-cleaner device activated by the piston yoke extension for circulating air through the tool-holder and about the impact-imparting device.

3. In a percussion device, the combination of an internal combustion motor including a piston with a yoke at the other end of the pison rod; a housing comprising a rectangular-section with an axially-related cylindrical portion; a hollow-extension, beyond the yoke, operative in said housing cylindrical portion; spaced reactive means with intervening bearing-members movable in said hollow extension; an impact-imparting device concentrically sustained by radially-movable elements between the bearing-members; said reactive means, bearing-members and radially-movable elements jointly serving to reduce operating vibration to the minimum; a removable tool-holder at the outer end of the housing cylindrical portion; means rigidly securing the power-unit, housing and tool-holder in co-axial alignment; means operative from and concurrently with the expansion stroke to the piston to incrementally-turn the tool-holder; pressure controlled means intermittently-actuable to force liquid through the tool-holder to the active end of the tool; an air-cleaner activated by the piston yoke extension effective to circulate cooling air about the impact-imparting device and through the tool-holder; and fan-means operatively coordinated to the piston-yoke for circulating air about the internal combustion motor.

4. In a percussion device, the combination of an internal combustion motor including a piston having a yoke at the remote end of the piston rod; a housing comprising a rectangular-section with an axially-related cylindrical portion; a hollow-extension, beyond the yoke, operative in said housing cylindrical portion; spaced reactive means with intervening bearing-members movable in said hollow extension; a hammer device concentrically sustained by radially-movable elements between the bearing-members; said reactive means, bearing-members, and radially-movable elements, jointly serving to reduce operating vibration to the minimum; a removable tool-holder at the outer end of the housing cylindrical portion; means rigidly securing the power-unit, housing, and tool-holder in co-axial alignment; means operative from and concurrently with the expansion-stroke of the piston to incrementally turn the tool-holder; pressure controlled means intermittently-actuable to force liquid through the tool-holder to the active end of the tool; an air-cleaner activated by the piston yoke extension effective to circulate cooling air about the hammer device and through the tool-holder; fan means operatively coordinated with the piston-yoke for circulating air about the internal combustion motor; and lever-actuated clutch means for starting the percussion device.

5. The combination of claim 4, wherein the piston yoke has a projection in direct alignment with the axis of the piston rod; the hollow-extension is of bell-like formation with the neck thereof rigidly attached to said yoke projection; a guide rod extends co-axially in the hollow-extension; the hammer device is in the form of solid cylinder having a relatively reduced striker extension; said hammer is provided with circumferentially-spaced longitudinal concave grooves; and the radially-movable elements are in the form of balls afforded joint guidance in said grooves and between bearing members, whereby said balls are constrained to direct paths of rotative bearing movement.

6. The combination of claim 4, wherein the reactive means comprise spaced spiral springs in compression intermediate an opposing pair of annular race members; the respective race members slidably fitting a main bore of the hollow-extension and each embodying an inward shouldering having a bevel face; said bevel faces being opposingly inclined and between which, and the confronting face of the hammer-device, the radially-movable elements jointly co-operate; and the spaced springs aforesaid respectively seat between an annular groove in the hollow-extension and the inner of the race members, and the outer of such race members and a cupped annulus at the open end of said extension.

7. The combination of claim 4, wherein the means rigidly securing together the power-unit, the housing, and the removable tool-holder, comprise through bolts having forked-heads fitting complemental anchorage recesses in opposed projections at the outer end of the housing cylindrical portion; lock-means engage the other ends of said through bolts; and relatively movable eye-bolts are fulcrumed to the through bolt forked-heads for clamping coaction with spaced lugs projecting outwardly from the tool-holder.

8. The combination of claim 4, wherein the removable tool-holder comprises a main body part for fixture to the percussion device housing; a relatively rotative inner cylindrical-head sustained by spaced ball-bearings in the main body part aforesaid; a chuck with circumferentially-spaced longitudinal-segments engaged with counterpart grooves in a bore through the cylindrical head; said chuck having a suitable section bore for reception of the shank of the work effecting bit; and means whereby the cylindrical-head and said chuck are jointly and incrementally rotatable.

9. The combination of claim 4, wherein the means operative to incrementally turn the tool-holder comprise a ratchet-clutch about said tool-holder, means operatively coordinating said clutch to a reciprocating device, a connection from the internal-combustion motor to said reciprocatory device for effecting active movement of the ratchet-clutch concurrent with the expansion stroke of the piston of said internal-combustion motor; and a reactive means for returning the clutch to its inactive position.

10. The combination of claim 4 further including a spring-influenced arrestor-device for automatic projection into the path of movement of the tool-holder to limit outward travel of said holder, and a manually-operable shifter for retracting the arrestor-device.

11. The combination of claim 4, wherein the fan means is operatively coordinated to the motor starting means by a double-crank, and said crank is coupled to the piston rod yoke by a roller connection having capacity for concurrent movement with said yoke as well as directionally at right angles thereto.

JOHN V. RICE, Jr.

REFERENCES CITED

The following references are of record in the file of this patent:

UNITED STATES PATENTS

| Number | Name | Date |
|---|---|---|
| 842,246 | Rice | Jan. 29, 1907 |
| 1,417,697 | Standiford | May 30, 1922 |
| 2,273,095 | Fitch | Feb. 17, 1942 |
| 2,333,419 | Fitch | Nov. 2, 1943 |